US011532061B2

(12) United States Patent
Sawahashi et al.

(10) Patent No.: US 11,532,061 B2
(45) Date of Patent: Dec. 20, 2022

(54) DISTRIBUTED RIDESHARING VEHICLE MANAGEMENT

(71) Applicant: KYNDRYL, INC.

(72) Inventors: Matsuo Sawahashi, Chiba (JP); Takashi Yanagisawa, Setagaya-ku (JP)

(73) Assignee: KYNDRYL, INC., New York, NY (US)

( * ) Notice: Subject to any disclaimer, the term of this patent is extended or adjusted under 35 U.S.C. 154(b) by 118 days.

(21) Appl. No.: 16/459,655

(22) Filed: Jul. 2, 2019

(65) Prior Publication Data

US 2021/0004929 A1    Jan. 7, 2021

(51) Int. Cl.
*G06Q 10/00* (2012.01)
*G06Q 50/30* (2012.01)
*G06Q 10/06* (2012.01)
*G06F 16/27* (2019.01)

(52) U.S. Cl.
CPC ....... *G06Q 50/30* (2013.01); *G06Q 10/06316* (2013.01); *G06F 16/27* (2019.01)

(58) Field of Classification Search
CPC . G06Q 50/30; G06Q 10/06316; G06Q 10/025
See application file for complete search history.

(56) References Cited

U.S. PATENT DOCUMENTS 9,857,190 B2 * 1/2018 Marueli ................ G06Q 10/02
10,685,416 B2 * 6/2020 Tolkin ................... G06Q 50/30
10,731,998 B2 * 8/2020 Rahematpura ......... G01C 21/28
10,733,888 B2 * 8/2020 Dannat ................... G08G 1/123
10,817,806 B2 * 10/2020 Meunier ................ G06F 16/29

(Continued)

FOREIGN PATENT DOCUMENTS

| CN | 104464275 A | 9/2016 |
|----|-------------|--------|
| JP | 2001134659 A | 5/2001 |

(Continued)

OTHER PUBLICATIONS

"How Drife and blockchain are disrupting the ride-sharing industry," Aug. 5, 2021, Press Release, "Coin Telegraph: The Future of Money"(Year: 2021).*

(Continued)

*Primary Examiner* — Rutao Wu
*Assistant Examiner* — Scott M Ross
(74) *Attorney, Agent, or Firm* — Erik Swanson; Andrew M. Calderon; Calderon Safran & Cole P.C.

(57) ABSTRACT

Managing ridesharing vehicles by receiving passenger data comprising pick-up and drop-off location data of passengers, recording the passenger data in one or more queues corresponding to one or more pick-up locations of the pick-up location data, and sending information associated with a first pick-up location to a first vehicle. In response to the first vehicle arriving at the first pick-up location, extracting data of passengers exiting the first vehicle at the first pick-up location, retrieving passenger data from a first queue corresponding to the first pick-up location according to a capacity of the first vehicle, and updating a passenger ledger of the first vehicle according to the data of the passengers exiting the first vehicle at the first pick-up location and the passenger data retrieved from the first queue.

20 Claims, 8 Drawing Sheets

(56) References Cited

U.S. PATENT DOCUMENTS

| | | | |
|---|---|---|---|
| 2004/0158483 A1* | 8/2004 | Lecouturier | G06Q 10/025 |
| | | | 705/6 |
| 2015/0254581 A1* | 9/2015 | Brahme | G06F 16/29 |
| | | | 705/5 |
| 2016/0321771 A1* | 11/2016 | Liu | G01C 21/3438 |
| 2017/0132544 A1* | 5/2017 | Michel | G06Q 50/30 |
| 2017/0227370 A1* | 8/2017 | O'Mahony | G01C 21/3453 |
| 2017/0314948 A1 | 11/2017 | Racah et al. | |
| 2018/0293521 A1 | 10/2018 | Akselrod et al. | |
| 2020/0041292 A1* | 2/2020 | Sugiyama | B60Q 1/02 |
| 2020/0334652 A1* | 10/2020 | Kumar | G06Q 20/145 |
| 2021/0264539 A1* | 8/2021 | Leise | G06F 16/9024 |
| 2022/0169258 A1* | 6/2022 | Samarthyam | G08G 1/20 |

FOREIGN PATENT DOCUMENTS

| | | | |
|---|---|---|---|
| JP | 2002163335 A | | 6/2002 |
| JP | 2003288516 A | | 10/2003 |
| JP | 2004164256 A | | 6/2004 |
| JP | 2005258840 A | | 9/2005 |
| JP | 2010210319 A | | 9/2010 |
| WO | 2018197508 A1 | | 11/2018 |

OTHER PUBLICATIONS

Booking a taxi ride on distributed ledgers: A smart contract example (Part I), Digital Asset, Developers, by Rafael G. on Jul. 5, 2022

"Blockchain & Ridesharing"; BBN Times, Sep. 21, 2019, https://www.bbntimes.com/technology/blockchain-ridesharing (Year: 2022).*

"Blockchain & Ridesharing"; BBN Times, Sep. 21, 2019 https://www.bbntimes.com/technology/blockchain-ridesharing (Year: 2019).*

"Introducing Spotlight—making it easier to connect with your ride", Uber Blog, Nov. 8, 2018, Australia, 7 pages, <https://www.uber.com/en-AU/blog/introducing-spotlight-easily-connect-with-your-ride/>.

"Riding with Uber", Spotlight, Helps Your Driver Find You Quicker, Uber, 4 pages, <https://www.uber.com/ride/how-uber-works/spotlight/>.

"About—BRIDJ", printed on Dec. 10, 2018, 7 pages, © BRIDJ Pty Ltd 2018, <https://www.bridj.com/how-it-works/>.

"BRIDJ", printed on Dec. 10, 2018, 5 pages, <https://www.bridj.com/>.

"Community Bus "Kururin" Users' Guide", Fukaya City, Updated date: Oct. 1, 2018, English Translation, retrieved from the Internet on Jan. 8, 2019, 6 pages <http://honyaku.j-server.com/LUCFKYC/ns/tl.cgi/http%3a//www.city.fukaya.saitama.jp/soshiki/toshiseibi/toshikeikaku/tanto/kornyunitibasukururin/1424933812224.html?SLANG=ja&TLANG=en&XMODE=0&XCHARSET=utf-8&XJSID=0>.

"Community Bus Route Map for Fukaya City", retrieved from the Internet Jan. 8, 2019, 2 pages, no translation available, <http://honyaku.j-server.com/LUCFKYC/ns/tl.cgi/http%3a//www.city.fukaya.saitama.jp/ikkrwebBrowse/material/files/group/37/kokyokotsuguide_jikokuhyo201810.pdf?SLANG=ja&TLANG=en&XMODE=0&XCHARSET=utf-8&XJSID=0>.

* cited by examiner

DISTRIBUTED RIDESHARING VEHICLE MANAGEMENT

BACKGROUND

The present invention relates generally to the field of transportation resource management, and more particularly to distributed transportation resource sharing.

Ridesharing is a term used to describe a transportation service where the driver of a vehicle and a rider have a common destination. The driver will then share the vehicle with the rider and, in turn, the rider will make a payment to the driver, which subsidizes the cost of the trip for the driver. Ridesharing is typically booked in real-time over the internet using a website or with a smartphone application to connect passengers with ridesharing drivers.

A distributed public ledger (e.g., a blockchain) is a system in which information is recorded and maintained across a plurality of computing devices that are linked together in a peer-to-peer network. The recorded ledger entries can comprise many forms, including a transfer of money, ownership, a financial transaction, a person's identity, personal information, or an agreement between two parties.

SUMMARY

Embodiments of the present invention disclose a method, computer program product, and system for managing ridesharing vehicles by receiving passenger data comprising pick-up and drop-off location data of passengers, recording the passenger data in one or more queues corresponding to one or more pick-up locations of the pick-up location data, and sending information associated with a first pick-up location to a first vehicle. In response to the first vehicle arriving at the first pick-up location, extracting data of passengers exiting the first vehicle at the first pick-up location, retrieving passenger data from a first queue corresponding to the first pick-up location according to a capacity of the first vehicle, and updating a passenger ledger of the first vehicle according to the data of the passengers exiting the first vehicle at the first pick-up location and the passenger data retrieved from the first queue.

DETAILED DESCRIPTION

Embodiments in accordance with the present invention include methods applied to the transportation of individual passengers using ridesharing vehicles and services. The methods of these embodiments may further be applied to the transportation of goods using multiple carriers as well the transportation of individuals and goods using diverse carriers, such as combinations of airplanes, trains, ships, cars and trucks for different segments of an overall routing to transport goods from a starting point to a destination point.

Embodiments in accordance with the present invention recognize that public transportation systems, such as busses and taxis, have limitations on carrying capacities which can result in many passengers experiencing severe weather conditions while waiting at bus and taxi stands in extremely long queues for several hours. For example, when events such as mass power outages occur, public transportation services may be reduced to public busses and taxis services. During these outages, public transportation systems can experience high volumes of passengers which result in extremely long queues and wait times that can last several hours.

Figure 1:
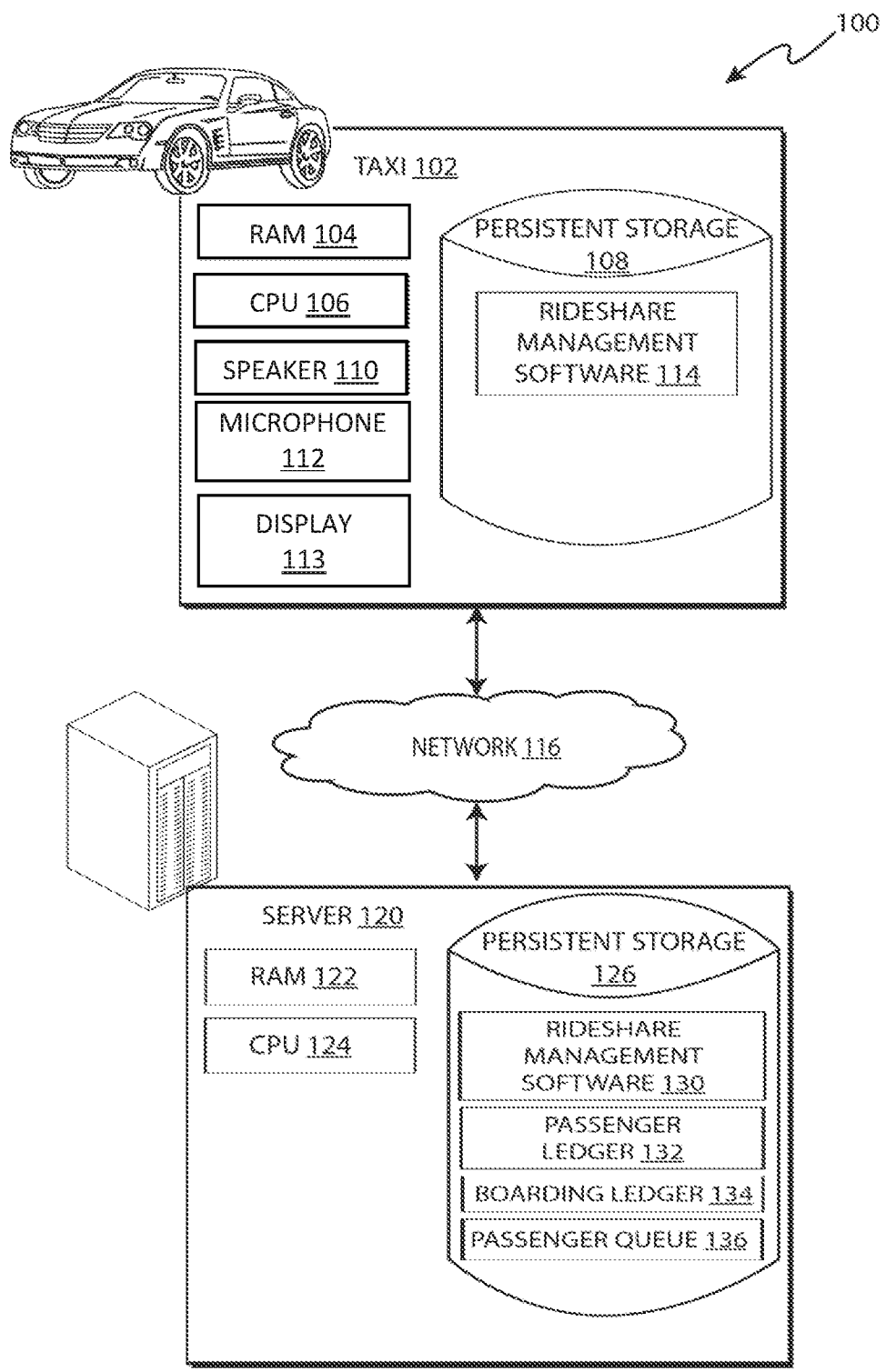
FIG. 1 is a functional block diagram illustrating a distributed ridesharing environment, in an embodiment in accordance with the present invention.

Embodiments in accordance with the present invention will now be described in detail with reference to the Figures. FIG. 1 is a functional block diagram, generally designated 100, illustrating a distributed ridesharing environment, in an embodiment in accordance with the present invention Distributed ridesharing environment 100 includes taxi 102, server 120, and other computing devices (not shown), all interconnected over network 116. Taxi 102 includes random access memory (RAM) 104, central processing unit (CPU) 106, persistent storage 108, speaker 110, and microphone 112. Taxi 102 may contain a Web server, or any other electronic device or computing system, capable of processing program instructions and receiving and sending data. In some embodiments, taxi 102 may include a laptop computer, a tablet computer, a netbook computer, a personal computer (PC), a desktop computer, a personal digital assistant (PDA), a smart phone, or any programmable electronic device capable of communicating over a data connection to network 116. In other embodiments, taxi 102 may utilize multiple server computing systems comprised of multiple computers as a server system, such as in a distributed computing environment. In general, taxi 102 is representative of any electronic device or combinations of electronic devices capable of executing machine-readable program instructions and communicating with server 120 via network 116 and with various components and devices (not shown) within distributed ridesharing environment 100.

Taxi 102 includes persistent storage 108. Persistent storage 108 may, for example, be a hard disk drive. Alternatively, or in addition to a magnetic hard disk drive, persistent storage 108 may include a solid-state hard drive, a semiconductor storage device, read-only memory (ROM), erasable programmable read-only memory (EPROM), flash memory, or any other computer-readable storage medium that is capable of storing program instructions or digital information. Taxi 102 may include internal and external hardware components, as depicted and described in further detail with respect to FIG. 8.

In an embodiment, rideshare management software 114 is stored in persistent storage 108, which also includes operating system software (not shown), as well as software that enables taxi 102 to perform passenger rideshare management and communicate with server 120 and other computing devices (not shown) of distributed ridesharing environment 100 over a data connection on network 116. In other example embodiments, rideshare management software 114 may be a component of an operating system software.

Rideshare management software 114 is a computer program, or a set of computer programs, that are stored in persistent storage 108. Rideshare management software 114 enables a user to register with the software, provide a pick-up location and drop-off location, and to have their travel and associated billing, managed by the rideshare management software.

In an embodiment, taxi 102 includes speaker 110 (i.e., human interface element). Speaker 110 is used by rideshare management software 114 to emit sounds to alert passengers when arriving to pick up areas. For example, when taxi 102 approaches a designated pickup area, rideshare management software 114 can emit one or more sounds using speaker 110 to alert passengers of the arrival of taxi 102. In other example embodiments, rideshare management software 114 can emit sounds to warn passengers to make sure the area outside taxi 102 is safe before exiting the vehicle. In other example embodiments, speaker 110 can be used as a Bluetooth speaker by a passenger using a smartphone.

In an embodiment, taxi 102 includes microphone 112. Microphone 112 enables taxi 102 to capture one or more audio streams of one or more passengers in the physical space inside of taxi 102. For example, a passenger can speak a verbal command to rideshare management software 114 to alter a taxi route or a final destination. In one example embodiment, a passenger of taxi 102 can manually enable/disable microphone 112. In other example embodiments, microphone 112 can be enabled/disabled by rideshare management software 114. In yet another example embodiment, rideshare management software 114 can receive audio data (e.g., a command from a passenger), as part of an authentication process when the passenger enters taxi 102.

In an embodiment, taxi 102 can further include one or more display elements 113. Display elements 113 can comprise simple lighting elements, such as mono or multi-color light emitting diode (LED) elements used for purposes or signaling to passengers. In an embodiment, display elements 113 comprise digital display elements adapted to display simple or multimedia output from the Rideshare management software 130.

In FIG. 1, network 116 is shown as the interconnecting fabric between taxi 102, server 120, and with various components and devices (not shown) within distributed ridesharing environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between taxi 102, server 120, and with various components and devices (not shown) within distributed ridesharing environment 100.

Server 120 is included in distributed ridesharing environment 100. Server 120 includes random access memory (RAM) 122, central processing unit (CPU) 124, and persistent storage 126. Server 120 may be a Web server, or any other electronic device or computing system, capable of processing program instructions and receiving and sending data. In some embodiments, server 120 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 120 may represent server computing systems utilizing multiple computers as a server system, such as in a distributed computing environment. In general, server 120 is representative of any electronic devices or combinations of electronic devices capable of executing machine-readable program instructions and communicating with taxi 102 via network 116 and with various components and devices (not shown) within distributed ridesharing environment 100.

Server 120 includes persistent storage 126. Persistent storage 126 may, for example, be a hard disk drive. Alternatively, or in addition to a magnetic hard disk drive, persistent storage 126 may include a solid-state hard drive, a semiconductor storage device, read-only memory (ROM), erasable programmable read-only memory (EPROM), flash memory, or any other computer-readable storage medium that is capable of storing program instructions or digital information. Rideshare management software 130, passenger ledger 132, boarding ledger 134, and passenger queue 136 are stored in persistent storage 126, which also includes operating system software, as well as software that enables server 120 to detect and establish a connection to taxi 102 and communicate with other computing devices (not shown) of distributed ridesharing environment 100 over a data connection on network 116.

Rideshare management software 130 is a computer program, or set of computer programs, that are stored in persistent storage 126. Rideshare management software 130 enables a passenger to register with the service and provide a starting location and final destination. Rideshare management software 130 then adds the passenger to the appropriate passenger queue and calculates a wait time for the passenger according to the status of system taxis as described below.

Persistent storage 126 further includes one or more passenger ledgers 132. The passenger ledgers contain passenger ledger entries which include a passenger identifier, the passenger's pick-up and drop-off locations, and the current status of the passenger—the taxi number the passenger is riding in, or a waiting status for the passenger at a taxi stop.

Persistent storage 126 includes one or more boarding ledgers 134, which include ledger entries for each taxi, the ledger entries contain a taxi identifier, the start and stop locations for the current trip, as well as passenger identifiers together with the pick-up location and drop-off location of each passenger.

Persistent storage 126 can also include one or more passenger queues 136. The entries of the passenger queues are specific to each taxi boarding location. The entries provide information relating to the passengers currently waiting at each traffic stop. The passenger entries can be ranked according to the time each passenger arrived at, or registered with, the taxi stand. Passengers may be assigned to arriving taxis according to their ranking in the passenger queues.

Figure 2A:
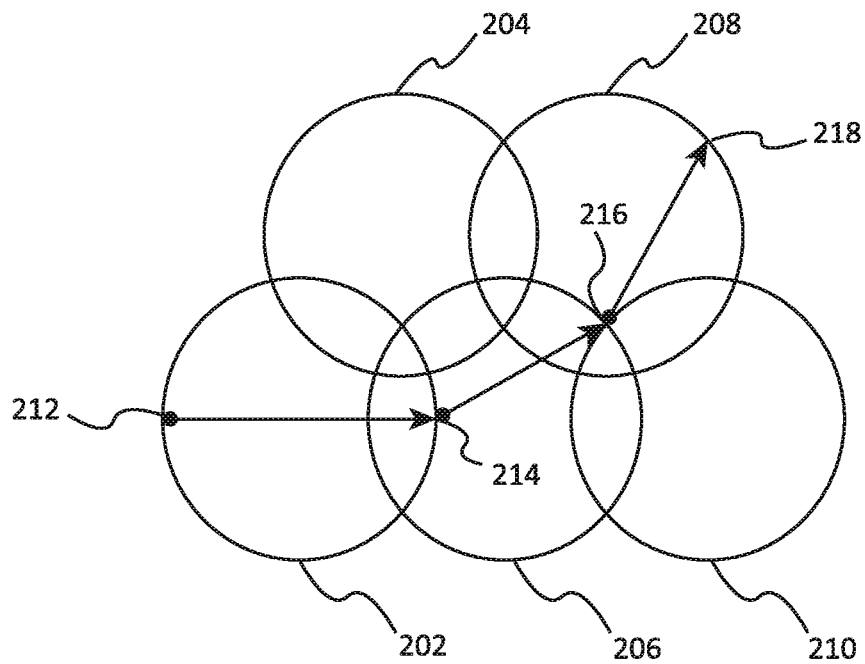
FIGS. 2A and 2B are schematic illustrations of taxi boarding routes within a plurality of service areas, for traveling to a final destination using multiple ridesharing taxis across the plurality of service areas, in an embodiment in accordance with the present invention.
Figure 2B:
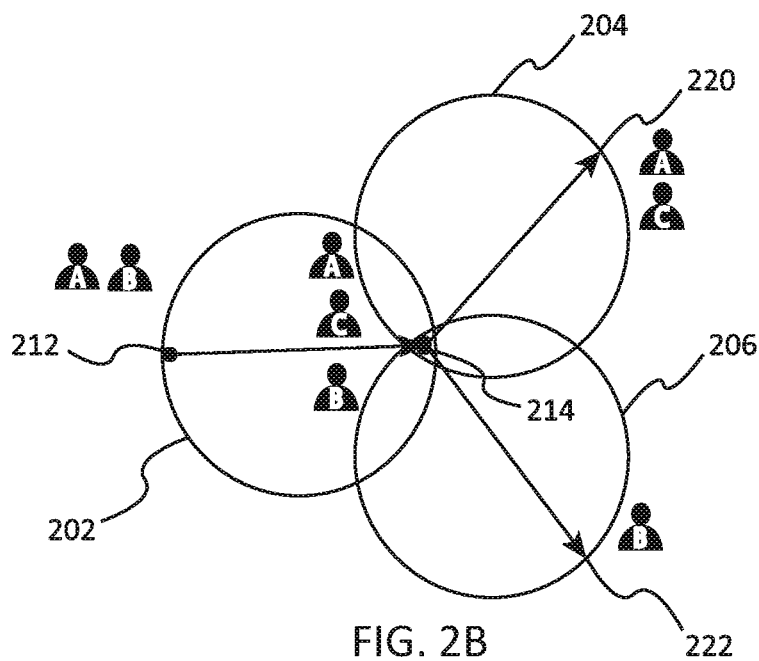

FIGS. 2A and 2B schematically illustrate taxi boarding routes within a plurality of service areas, for traveling to a final destination using multiple ridesharing taxis across the plurality of service areas, in an embodiment in accordance with the present invention. Routing for passengers traversing multiple service areas can be improved by taking a passenger from a pick-up location to their final drop-off location using multiple vehicles with each vehicle remaining within the boundaries of the vehicle's service area. As provided in FIG. 2A, a geographic region is defined by overlapping sub-geographic regions, or service areas, 202, 204, 206, 208, and 210. As directed by the rideshare management software 130, a passenger travelling from pick-up location 212, to final drop-off location 218, could take a single taxi across service areas 202, 206, and 208 thereby arriving at drop-off location 218 leaving a taxi driver from service area 202 at a location in service area 208, potentially wasting taxi resources. In an embodiment, the passenger leaves pick-up location 212, in a first taxi and travels across service area 202 to a first pick-up, drop-off location 214, at the edge of service area 202 and within service area 206. Pick-up, drop-off locations can be a taxi stand or landmark known to have regular taxi service. The passenger then takes a second taxi from pick-up, drop-off location 214, across service area 206, to pick-up, drop-off location 216, at the edge of service area 206 and within service area 208. The passenger then takes a third taxi from pick-up, drop-off location 216, to their final drop-off location 218.

FIG. 2B illustrates the travels of three passengers, A, B, and C. A wishes to travel from pick-up location 212 to final drop-off location 220. B wishes to travel from pick-up location 212 to final drop-off location 222. C is waiting in the queue at pick-up, drop-off location 214 and also wishes to travel to final drop-off location 220. As provided in FIG. 2B, directed by the rideshare management software 130, passengers A and B, take a first taxi from pick-up location 212, across service area 202 to pick-up, drop-off location 214, at the edge of service areas 202, 204, and 206. A joins C in the queue from drop-off location 214, to final drop-off location 220. A and C then share a second taxi across service area 204, to their final drop-off location at 220. Passenger B joins the queue from pick-up, drop-off location 214 to their final drop-off location 222, and then takes a third taxi from pick-up, drop-off location 214 across service area 206, to their final destination at 222.

Figure 3A:
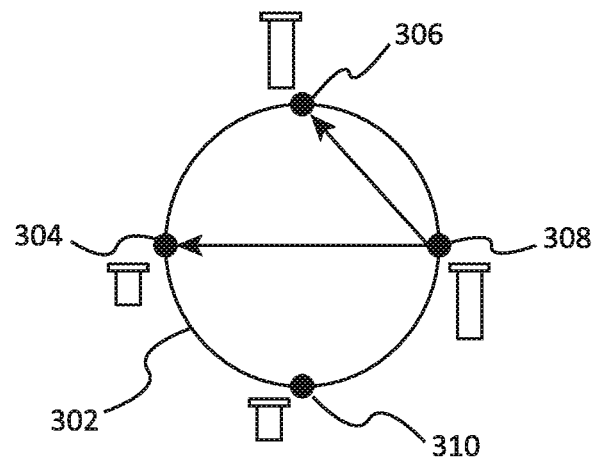
FIGS. 3A and 3B are schematic illustrations of route selection logic for a taxi within a plurality of service areas, in an embodiment in accordance with the present invention.
Figure 3B:
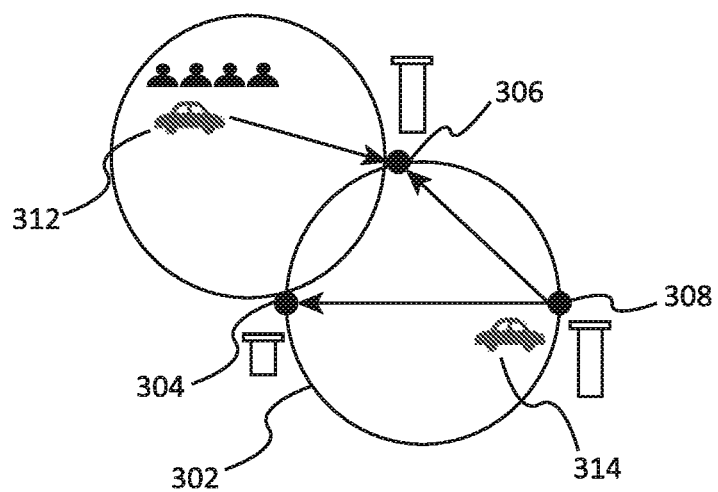

FIGS. 3A and 3B are schematic illustrations of route selection logic for a taxi within a plurality of service areas, in an embodiment in accordance with the present invention. FIG. 3A shows the route selection logic for a taxi at taxi stand 308. First, the logic considers the destinations the passengers waiting in the queue at taxi stand 308, beginning with the first passenger is the queue. When the queue is empty, the logic next considers which taxi stand (304, 306, or 310) in the service area 302, has the longest queue. The length of the queue is calculated as the sum of the waiting times of all of the passengers in the queue at the time of calculation. This logic can lead to situations where no taxis travel to taxi stand 306 as long as there are passengers waiting at taxi stand 308 and none of them wishes to travel to taxi stand 306. In these situations, the queue at taxi stand 306 may persist for a long time. A resolution to this issue can be to have an empty taxi travel from taxi stand 308 to taxi stand 306, even though there are passengers waiting at taxi stand 308. The logic may also consider the overall time required for a multi-stop route. According to the figure, taxis should be routed from taxi stand 308 to taxi stand 306 and then taxi stand 304, when the time required for that route is less than routing the taxi from taxi stand 308 to taxi stand 304 and finally to taxi stand 306.

FIG. 3B schematically illustrates alternative route selection logic, according to an embodiment of the invention. In this embodiment, the waiting time associated with future, soon-to-be-arriving passengers is included in calculating the length of the queue at each taxi stand of the service area. The length of the queue when the taxi will arrive at the taxi stand is calculated rather than the length of the queue when the taxi is leaving its starting location. As shown in the figure, a first taxi 314 is preparing to leave taxi stand 308 for either taxi stand 306 or taxi stand 304. The system calculates that it will take first taxi 314 10 minutes to arrive at either of the taxi stands, 304, and 306. There is currently a single passenger at taxi stand 304 who has been waiting for 10 minutes, so in ten minutes the total length of that queue will be 1 passenger×20 minutes=20 minutes total. Taxi 312, carrying four passengers, will arrive at taxi stand 306 in 4 minutes. In ten minutes, when taxi 314 could be arriving at taxi stand 306, those four passengers will have waited 6 minutes for a total queue length of 4 passengers×6 minutes=24 minutes total. Taxi 314 should proceed to taxi stand 306 to minimize the overall waiting time of system passengers.

In an embodiment, the determination of the route(s) for a passenger proceeds as follows: service areas to be traversed are determined, the transition points between service areas are then determined. Considering the movement of passenger A, from their pick-up to final drop-off locations, the system considers alternative routes between pick-up and drop-off across multiple service areas. The system can define traversing fewer service areas as more efficient that traversing more service areas. Though it may be possible to define a route through more service areas which appears more efficient than a route through fewer service areas, the system can consider wait times at transfer points as well as in-transit timing to select the route with fewer service areas as superior. Passenger turnover rates of different service areas can be considered in determining which of several routes to select. A route through service areas having higher service levels, and low passenger wait times, can be considered superior to a route traversing the same number of service areas but crossing service areas having a lower level of service, and higher passenger wait times. Turnover rate can be considered as the number of passengers served per unit of time, e.g., passengers per hour.

Routes for vehicles carrying more than a single passenger must also take into consideration the final drop-off locations of all passengers. Such routes should minimize the number of service areas traversed and the waiting time for the passengers as a group and not simply optimize the route for the benefit of a single passenger to the detriment of the other passengers.

After selecting the route in terms of service areas, the system considers the transit points at the boundaries between service areas. Transit point taxi stand information, including location, current wait time, and historical wait time data can be maintained in a master registry of the system held in persistent memory of the system servers. The system evaluates taxi stand options in terms of distance and travel time considering local traffic conditions, as well as taxi stand turnover rates and current passenger queues/turnover rates at the stands. A taxi stand having a longer distance in terms of transit time can be preferred if the current queue/turnover rate combination of that stand indicates less wait time for the passengers than an alternative taxi stand having a shorter transit time but a longer passenger queue/turnover rate combination.

In an embodiment, passengers can share a taxi for the final segment of their respective journeys. Each passenger may have a destination within the service area of the taxi. In this embodiment, the system calculates a route based upon the combined transit time for the passengers. As an example, A, B, and C, board a taxi at a taxi stand. Each passenger's destination is within the local service area. The system compares the routes: A-B-C; A-C-B; B-C-A; B-A-C; C-A-B; and C-B-A; in terms of the total transit time for each route. The system then selects the route having the shortest total travel time.

In an embodiment, the system connects many passengers and different taxi companies and ridesharing services. Taxi companies, taxis, and passengers can access a common ledger for authentication of taxi—passenger combinations, queueing, routing, records of boarding and departing, and billing purposes. In this embodiment, the common ledger can use blockchain technology to provide secure authentication and record keeping. The blockchain can be either a public distributed ledger blockchain, or a private ledger held by a system administrating company. In an embodiment, a boarding or departing passenger provides a system provided marker, such as a barcode, QR code, or other marker, to the taxi driver using a device such as a smart phone. The driver uses a scanner built into the taxi, or the driver's smart phone to accept the marker, the system can authenticate the taxi to the passenger and the passenger to the taxi and record the boarding/departure of the passenger by updating appropriate ledger entries.

Figure 4:
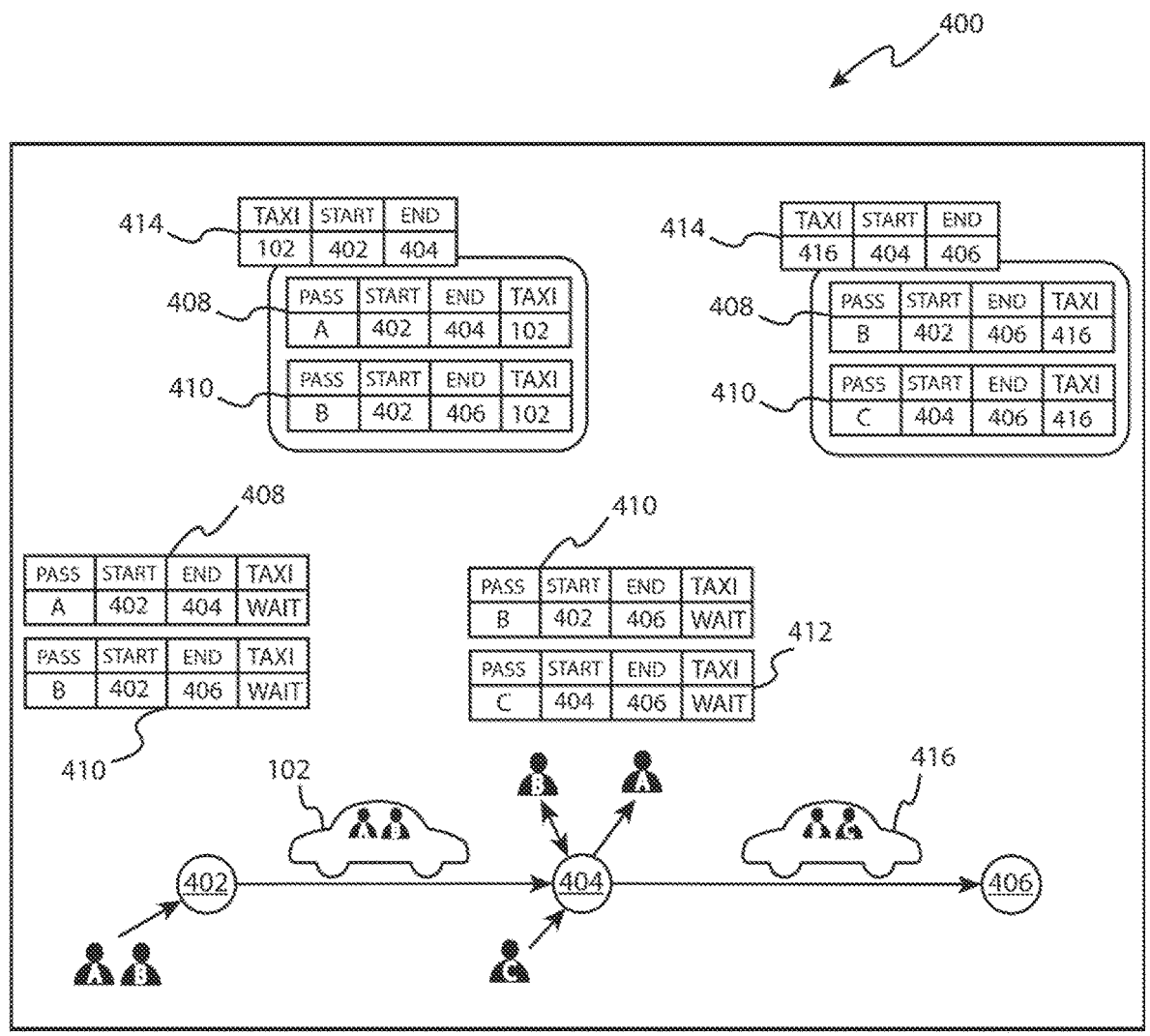
FIG. 4 is a schematic illustration of a blockchain data structure for identifying passengers, authenticating drivers, and billing, in an embodiment in accordance with the present invention.

FIG. 4 is schematic illustration, generally designated 400, illustrating a blockchain data structure for identifying passengers, authenticating drivers, and billing, in an embodiment in accordance with the present invention. As provided in the figure, passengers A and B are in a queue at taxi stand 402. The passenger queue for taxi stand 402, includes entries 408 and 410 from the passenger ledger with trip information for each of A and B. A route is planned for A from 402 to 404, and for B from taxi stand 402, to taxi stand 404, and then to taxi stand 406. After A and B board taxi 102, boarding ledger entry 414, includes ledger entries 408 and 410. The queue for taxi stand 402, is now empty.

After taxi 102 arrives at taxi stand 404, (A's final drop-off location according to ledger entry 408), taxi stand 404's queue includes ledger entries 410 and 412 for each or B, and C. B and C board taxi 416 departing from taxi stand 404 to taxi stand 406. The passenger ledger entry for A is now cleared. Boarding ledger entry 414 for taxi 416 now includes ledger entries 410 and 412 for the two passengers in the taxi. After the arrival of taxi 416 at taxi stand 406 (the final destination of each of B and C, the boarding ledger entry for taxi 416 will be cleared, as will the passenger ledger entries for B and C.

Figure 5:
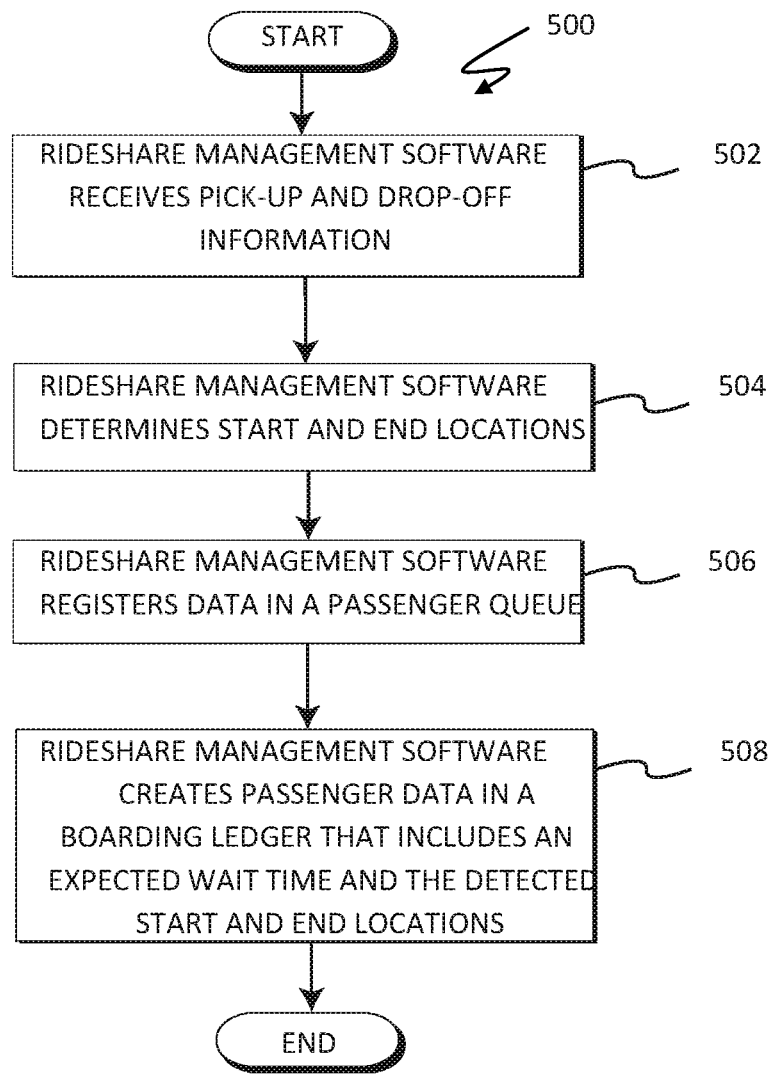
FIG. 5 is a flowchart depicting operational steps of a rideshare management software, on a server computer within the distributed ridesharing environment of FIG. 1, for receiving information and scheduling a pickup, in an embodiment in accordance with the present invention.

FIG. 5 is a flowchart, generally designated 500, depicting operational steps of a rideshare management software, on a server computer within the distributed ridesharing environment of FIG. 1, for receiving information and scheduling a pickup, in an embodiment in accordance with the present invention. As shown in the figure, after program start, the rideshare management software receives passenger information including pick-up and drop-off information from a potential passenger, at 502. The passenger has registered with a service using the software. Passenger identifying and contact information is entered into the passenger ledger of the system, together with their current location and desired pick-up and drop-off information. The system determines transit points for the passenger's route according to available taxi stand points and the passenger's indicated pick-up and drop-off information at 504. At 506, the system adds information from the passenger ledger to the passenger queue for the determined transit point. The information includes passenger identifiers, start and destination information from the passenger ledger, and a registration time associated with the order in which passengers are added to the queue. At 508, the passenger information is added to the boarding ledger. The entry includes passenger information (identity and contact information), pick-up and drop-off information, current status (taxi identifier or "waiting"), and calculated wait time for the passenger.

Figure 6:
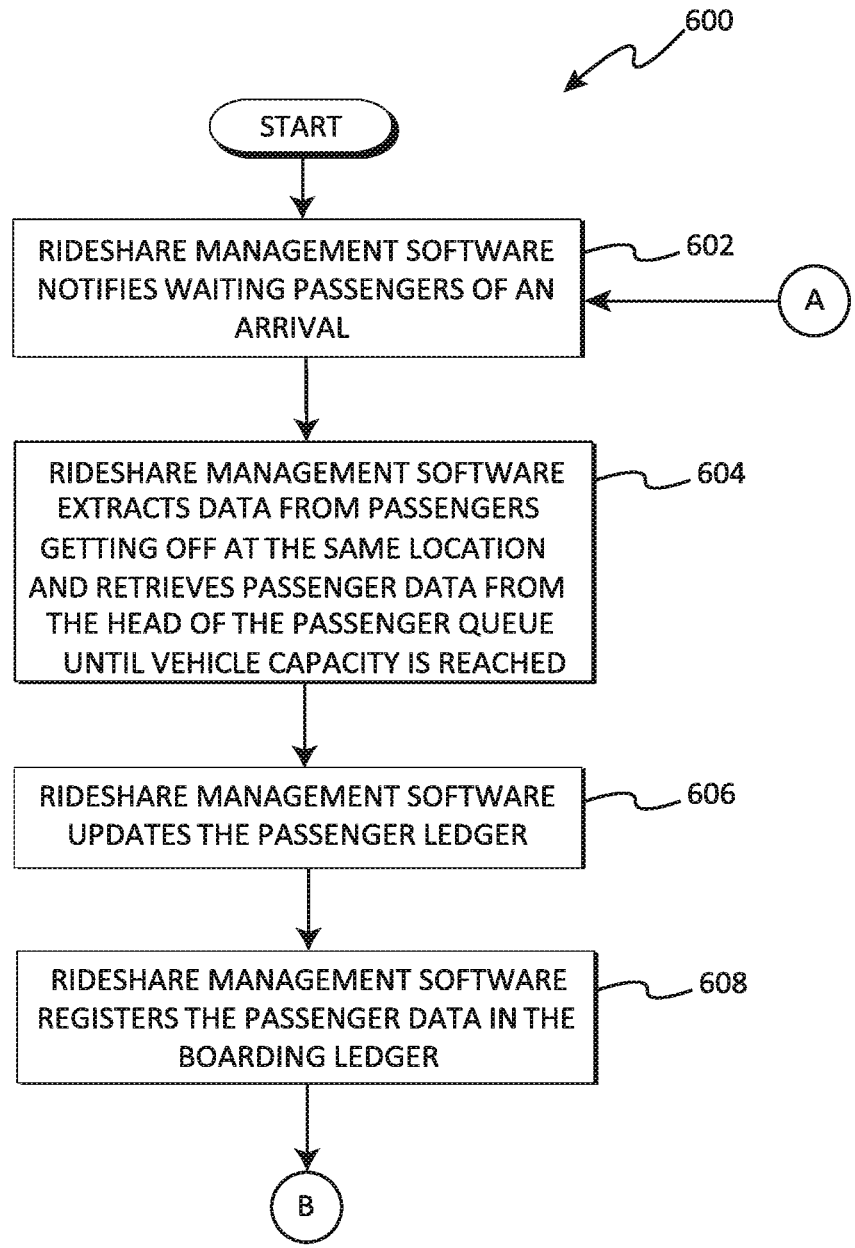
FIG. 6 is a flowchart depicting operational steps of a rideshare management software, on a server computer within the distributed ridesharing environment of FIG. 1, for processing passenger data upon the arrival of a taxi, in an embodiment in accordance with the present invention.

FIG. 6 is a flowchart, generally designated 600, depicting operational steps of a rideshare management software, on a server computer within the distributed ridesharing environment of FIG. 1, for processing passenger data upon the arrival of a taxi, in an embodiment in accordance with the present invention. After step 508 of FIG. 5, the system notifies waiting passengers of an arrival at their location at 602. The system evaluates the ledger entries of the waiting passengers according to a ranking of the passengers in the queue, beginning with the passenger at the head of the queue. The system extracts data associated with passengers getting out of the vehicle after it arrives at the location. The system updates the passenger ledger of the vehicle using the extracted information and reconciles the capacity of the vehicle with the exiting passengers to determine the available capacity of the vehicle. The system determines which passengers can be grouped into a taxi taking the first passenger further along their journey and notifies the first passenger and as many other passengers as can be efficiently accommodated with the first passenger, up to the capacity of the arriving vehicle, of the arrival, at 604. Notified passengers can be provided with identifying information about the arriving vehicle, vehicle type, color, registration and or license plate number, etc. In one embodiment, each notified passenger is provided with a ringtone or other audible marker which will match audible content played by their matched arriving taxi. In an embodiment, the passengers are provided with a visual marker which will be matched by display elements of the matched arriving taxi. In this embodiment, the passenger may be a color pattern and the arriving taxi may display the same pattern upon an external display element of the vehicle. At 606, the system modifies the relevant ledger entries of the passenger ledger to change the status of the passengers from waiting to the matched taxi number. At 608, the system changes the boarding ledger entries of the arriving taxi as passengers get out and as new passengers get in. The boarding ledger entries reflect the passenger manifest of the soon to be departing taxi. The method then proceeds to step B of the flowchart 700, of FIG. 7.

Figure 7:
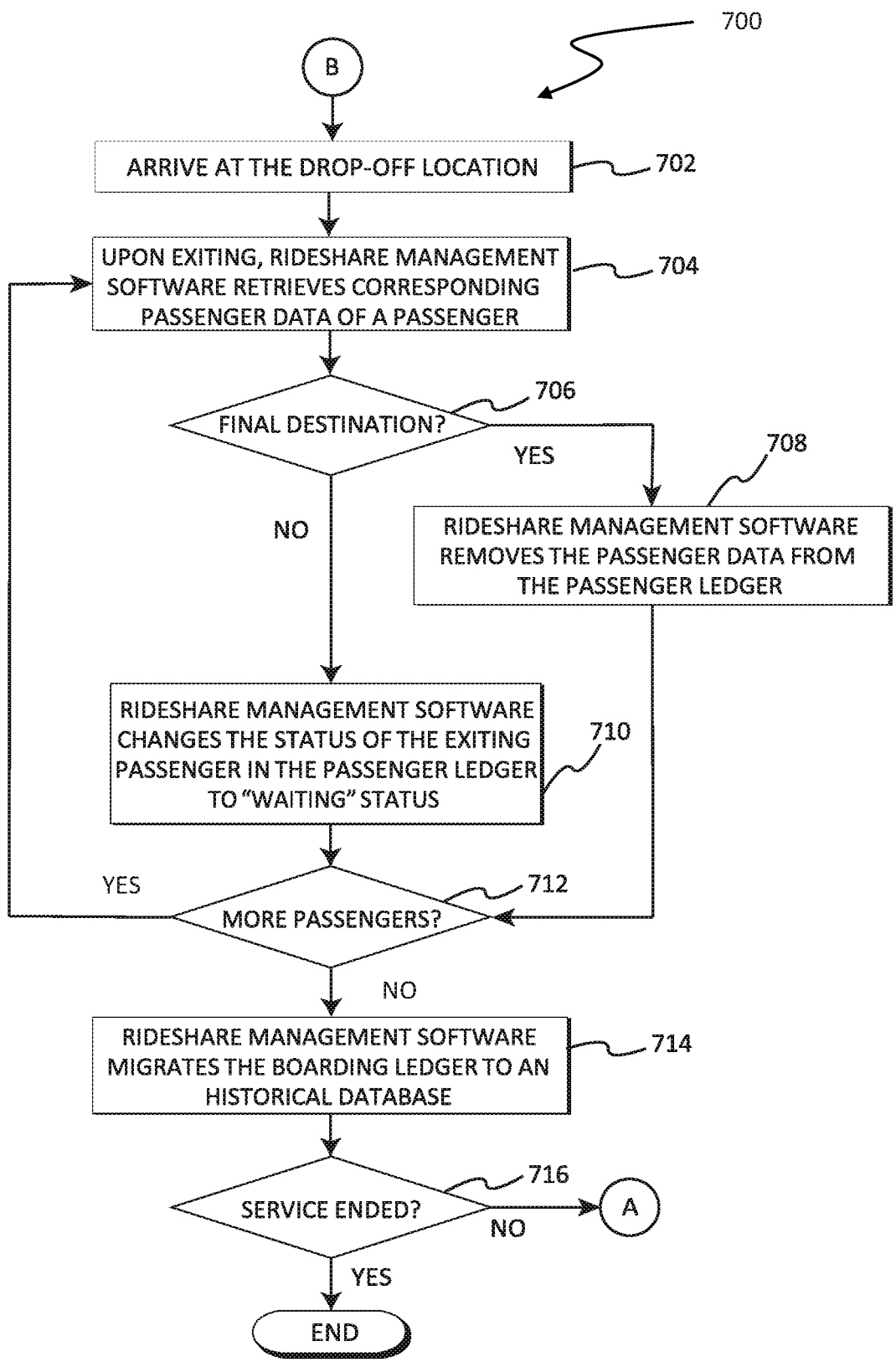
FIG. 7 is a flowchart depicting operational steps of a rideshare management software, on a server computer within the distributed ridesharing environment of FIG. 1, for processing passenger data upon reaching a drop-off location, in an embodiment in accordance with the present invention.

FIG. 7 is a flowchart, generally designated 700, depicting operational steps of a rideshare management software, on a server computer within the distributed ridesharing environment of FIG. 1, for processing passenger data upon reaching a drop-off location, in an embodiment in accordance with the present invention. After B, the method addresses the steps after the taxi arrives at its destination at 702. For each passenger of the taxi as it arrives the system retrieves the corresponding passenger ledger information at 704. At 706, the system determines if the passenger has reached their final destination. At 708, the system clears the passenger's information from the passenger ledger for those who have reached their final destination. At 710, the system changes the passenger ledger entry for those who have not yet reached their final destination, to waiting. The system then checks, at 712, to determine if there are additional passengers remaining in the taxi. If there are the system returns to step 704 to evaluate the status of the other passengers.

At 714, the boarding ledger entries for the completed routing are transferred to a historical ledger. Historical ledger entries can be used for billing and otherwise analyzed to evaluate user traffic and system usage patterns.

At 716, the system determines if service has ended for all passengers, the program closes when all service has ended, otherwise, the program continues to reference item "A" and returns to step 602, to process arriving taxis across the service area.

In an embodiment, the disclosed inventions can be utilized in the transportation of goods rather than individuals. In this embodiment, discrete packages can be substituted for passengers. Each package is registered with a system with an identifier and the origin and destination of each package is entered in a package ledger entry. Routes are calculated for each package according to origin and destination in terms of transportation service areas which will need to be traversed. Packages can be gathered at distribution hubs by collection services and then transported using a shared carrier across the respective service areas until they are finally distributed to final destination using a "last mile" carrier within the final service area. In this embodiment, the service areas can span the globe and transportation services can include cars, trucks, trains, ships and airplanes.

Figure 8:
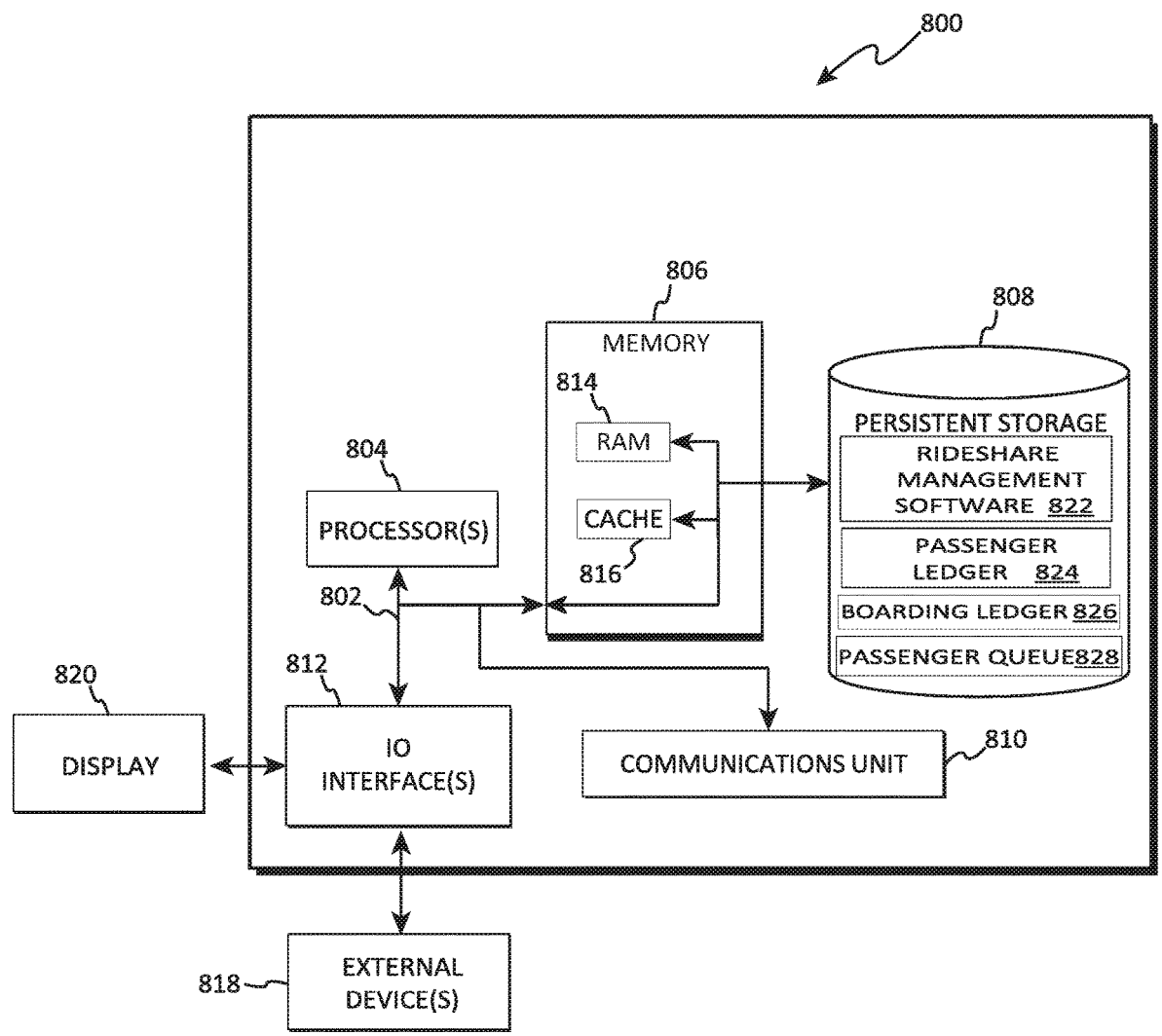
FIG. 8 depicts a block diagram of components of the server computer executing the rideshare management software, in an embodiment in accordance with the present invention.

FIG. 8 depicts a block diagram, generally designated 800, of components of the server computer executing the rideshare management software, in an embodiment in accordance with the present invention. It should be appreciated that FIG. 8 provides only an illustration of one implementation and does not imply any limitations with regard to the environments in which different embodiments may be implemented. Many modifications to the depicted environment may be made.

Taxi 102 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 814 and cache memory 816. In general, memory 806 can include any suitable volatile or non-volatile computer readable storage media.

Rideshare management software 822 is stored in persistent storage 808 for execution by one or more of the respective computer processors 804 via one or more memories of memory 806. Passenger ledger 824, boarding ledger 826, and passenger queue 828, utilized in the operations of rideshare management software 822 are also stored in persistent storage 808. In this embodiment, persistent storage 808 includes a magnetic hard disk drive. Alternatively, or in addition to a magnetic hard disk drive, persistent storage 808 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of network and client devices (not shown). In these examples, communications unit 810 includes one or more network interface cards. Communications unit 810 may provide communications through the use of either or both physical and wireless communications links. Rideshare management software 822 may be downloaded to persistent storage 808 through communications unit 810.

I/O interface(s) 812 allows for input and output of data with other devices that may be connected to taxi 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., rideshare management software 822, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer implemented method for managing vehicles comprising:
    defining a geographic area as overlapping sub-geographic regions;
    receiving, by one or more computer systems, passenger data comprising pick-up and drop-off location data of passengers, the pick-up and drop-off location data associated with different sub-geographic regions;
    recording, by the one or more computer systems, the passenger data in one or more queues corresponding to one or more pick-up locations of the pick-up location data;
    sending, by the one or more computer systems, information associated with a first pick-up location and a first drop-off location to a first vehicle, the first vehicle located in a first sub-geographic region including the first pick-up location and the first drop-off location;
    in response to the first vehicle arriving at the first pick-up location, authenticating a passenger exiting the first vehicle at the first pick-up location comprising:
        scanning a system provided marker from the passenger using a device communicating with the one or more computer systems;
        accepting the marker by the one or more computer systems; and
        extracting data of the passenger associated with the marker by the one or more computer systems;
    providing a first queue corresponding to the first pick-up location according to a capacity of the first vehicle, the first queue including one or more entries from a passenger ledger of the first vehicle with trip information of one or more passengers;
    retrieving, by the one or more computer systems, passenger data from the first queue corresponding to the first pick-up location according to a capacity of the first vehicle;
    updating, by the one or more computer processors, the one or more entries of the passenger ledger of the first vehicle using the data extracted in authenticating the passenger exiting the first vehicle at the first pick-up location and the passenger data retrieved from the first queue;
    sending, by the one or more computer systems, information associated with the first drop-off location and a second drop-off location to a second vehicle, the second vehicle located in a second sub-geographic region including the first drop-off location and the second drop-off location;
    in response to the second vehicle arriving at the first drop-off location, authenticating another passenger exiting the second vehicle at the first drop-off location comprising:
        scanning another system provided marker from the another passenger using another device communicating with the one or more computer systems;
        accepting the another marker by the one or more computer systems; and
        extracting data of the another passenger associated with the another marker by the one or more computer systems;
    providing a second queue corresponding to the first drop-off location according to a capacity of the second vehicle;
    retrieving, by the one or more computer systems, other passenger data from the second queue corresponding to the first drop-off location according to the capacity of the second vehicle; and
    updating, by the one or more computer processors, a passenger ledger of the second vehicle using the data extracted in authenticating the another passenger exiting the second vehicle at the first drop-off location and the other passenger data retrieved from the second queue.

2. The computer implemented method of claim 1, wherein sending information associated with a first pick-up location to the first vehicle comprises:
    determining, by the one or more computer systems, the first vehicle to minimize total passenger wait time.

3. The computer implemented method according to claim 1, further comprising calculating, by the one or more computer systems, queue length according to future arrivals.

4. The computer implemented method according to claim 1, further comprising using, by the one or more computer systems, a distributed ledger to record the passenger data.

5. The computer implemented method according to claim 1, further comprising retrieving, by the one or more computer systems, passenger data from the first queue according to a ranking of passengers in the queue.

6. The computer implemented method according to claim 1, further comprising signaling, by the one or more computer systems, matching ridesharing vehicles to new passengers using at least one of audible and visual markers.

7. A computer system for managing vehicles, the computer system comprising:
    one or more computer processors;
    one or more computer readable storage devices;
    stored program instructions on the one or more computer readable storage devices for execution by the one or more computer processors, the stored program instructions comprising:
        program instructions for defining a geographic area as overlapping sub-geographic regions;

program instructions for receiving passenger data comprising pick-up and drop-off location data of passengers, the pick-up and drop-off location data associated with different sub-geographic regions;

program instructions for recording the passenger data in one or more queues corresponding to one or more pick-up locations of the pick-up location data;

program instructions for sending information associated with a first pick-up location to a first vehicle, the first vehicle located in a first sub-geographic region including the first pick-up location and the first drop-off location;

program instructions for authenticating a passenger exiting the first vehicle at the first pick-up location, in response to the first vehicle arriving at the first pick-up location, comprising:
  scanning a system provided marker from the passenger using a device communicating with the one or more computer systems;
  accepting the marker by the one or more computer systems; and
  extracting data of the passenger associated with the marker by the one or more computer systems;

program instructions for providing a first queue corresponding to the first pick-up location according to a capacity of the first vehicle, the first queue including one or more entries from a passenger ledger of the first vehicle with trip information of one or more passengers;

program instructions for retrieving passenger data from the first queue corresponding to the first pick-up location according to the capacity of the first vehicle;

program instructions for updating the one or more entries of the passenger ledger of the first vehicle using the data extracted in authenticating the passenger exiting the first vehicle at the first pick-up location and the passenger data retrieved from the first queue;

program instructions for sending, by the one or more computer systems, information associated with the first drop-off location and a second drop-off location to a second vehicle, the second vehicle located in a second sub-geographic region including the first drop-off location and the second drop-off location;

program instructions for authenticating another passenger exiting the second vehicle at the first drop-off location, in response to the second vehicle arriving at the first drop-off location, comprising:
  scanning another system provided marker from the another passenger using another device communicating with the one or more computer systems;
  accepting the another marker by the one or more computer systems; and
  extracting data of the another passenger associated with the another marker by the one or more computer systems;

program instructions for providing a second queue corresponding to the first drop-off location according to a capacity of the second vehicle;

program instructions for retrieving, by the one or more computer systems, other passenger data from the second queue corresponding to the first drop-off location according to the capacity of the second vehicle; and program instructions for updating, by the one or more computer processors, a passenger ledger of the second vehicle using the data extracted in authenticating the passenger exiting the second vehicle at the first drop-off location and the other passenger data retrieved from the second queue.

8. The computer implemented method of claim 1, wherein the passenger ledger of the first vehicle and the second vehicle is a common ledger comprising blockchain technology to provide secure authentication and record keeping.

9. The computer implemented method of claim 8, further comprising recording boarding and departure information of the passenger of the first vehicle or the second vehicle by updating ledger entries of the common ledger.

10. The computer implemented method of claim 9, wherein the common ledger comprises vehicle and passenger combinations, queueing, routing, records of boarding and departing, and billing information.

11. A computer program product for managing vehicles, the computer program product comprising one or more computer readable storage devices and stored program instructions on the one or more computer readable storage devices, the stored program instructions comprising:

program instructions for defining a geographic area as overlapping sub-geographic regions;

program instructions for receiving passenger data comprising pick-up and drop-off location data of passengers, the pick-up and drop-off location data associated with different sub-geographic regions;

program instructions for recording the passenger data in one or more queues corresponding to one or more pick-up locations of the pick-up location data;

program instructions for sending information associated with a first pick-up location to a first vehicle, the first vehicle located in a first sub-geographic region including the first pick-up location and the first drop-off location;

program instructions for authenticating a passenger exiting the first vehicle at the first pick-up location, in response to the first vehicle arriving at the first pick-up location, comprising:
  scanning a system provided marker from the passenger using a device communicating with the one or more computer systems;
  accepting the marker by the one or more computer systems; and
  extracting data of the passenger associated with the marker by the one or more computer systems;

program instructions for providing a first queue corresponding to the first pick-up location according to a capacity of the first vehicle, the first queue including one or more entries from a passenger ledger of the first vehicle with trip information of one or more passengers;

program instructions for retrieving passenger data from the first queue corresponding to the first pick-up location according to the capacity of the first vehicle;

program instructions for updating the one or more entries of the passenger ledger of the first vehicle using the data extracted in authenticating the passenger exiting the first vehicle at the first pick-up location and the passenger data retrieved from the first queue;

program instructions for sending, by the one or more computer systems, information associated with the first drop-off location and a second drop-off location to a second vehicle, the second vehicle located in a second sub-geographic region including the first drop-off location and the second drop-off location;

program instructions for authenticating another passenger exiting the second vehicle at the first drop-off location, in response to the second vehicle arriving at the first drop-off location, comprising:
scanning another system provided marker from the another passenger using another device communicating with the one or more computer systems;
accepting the another marker by the one or more computer systems; and
extracting data of the another passenger associated with the another marker by the one or more computer systems;
program instructions for providing a second queue corresponding to the first drop-off location according to a capacity of the second vehicle;
program instructions for retrieving, by the one or more computer systems, other passenger data from the second queue corresponding to the first drop-off location according to the capacity of the second vehicle; and
program instructions for updating, by the one or more computer processors, a passenger ledger of the second vehicle using the data extracted in authenticating the passenger exiting the second vehicle at the first drop-off location and the other passenger data retrieved from the second queue.

12. The computer program product according to claim 11, wherein the program instructions sending information associated with a first pick-up location to the first vehicle comprise:
program instructions for determining the first vehicle to minimize total passenger wait time.

13. The computer program product according to claim 11, the stored program instructions further comprising program instructions for calculating queue length according to future arrivals.

14. The computer program product according to claim 11, the stored program instructions further comprising program instructions for using a distributed ledger to record the passenger data.

15. The computer program product according to claim 11, the stored program instructions further comprising program instructions for retrieving passenger data from a first queue according to a ranking of passengers in the queue.

16. The computer program product according to claim 11, the stored program instructions further comprising program instructions for signaling matching ridesharing vehicles to new passengers using at least one of audible and visual markers.

17. The computer system according to claim 7, the stored program instructions further comprising program instructions for retrieving passenger data from a first queue according to a ranking of passengers in the queue.

18. The computer system according to claim 7, wherein the program instructions for sending information associated with a first pick-up location to the first vehicle comprise:
program instructions for determining the first vehicle to minimize total passenger wait time.

19. The computer system according to claim 7, the stored program instructions further comprising program instructions for calculating queue length according to future arrivals.

20. The computer system according to claim 7, the stored program instructions further comprising program instructions for using a distributed ledger to record the passenger data.

* * * * *